Jan. 8, 1935.  C. NORRIS  1,987,536
SLIDE RULE
Filed Nov. 15, 1932  2 Sheets-Sheet 1
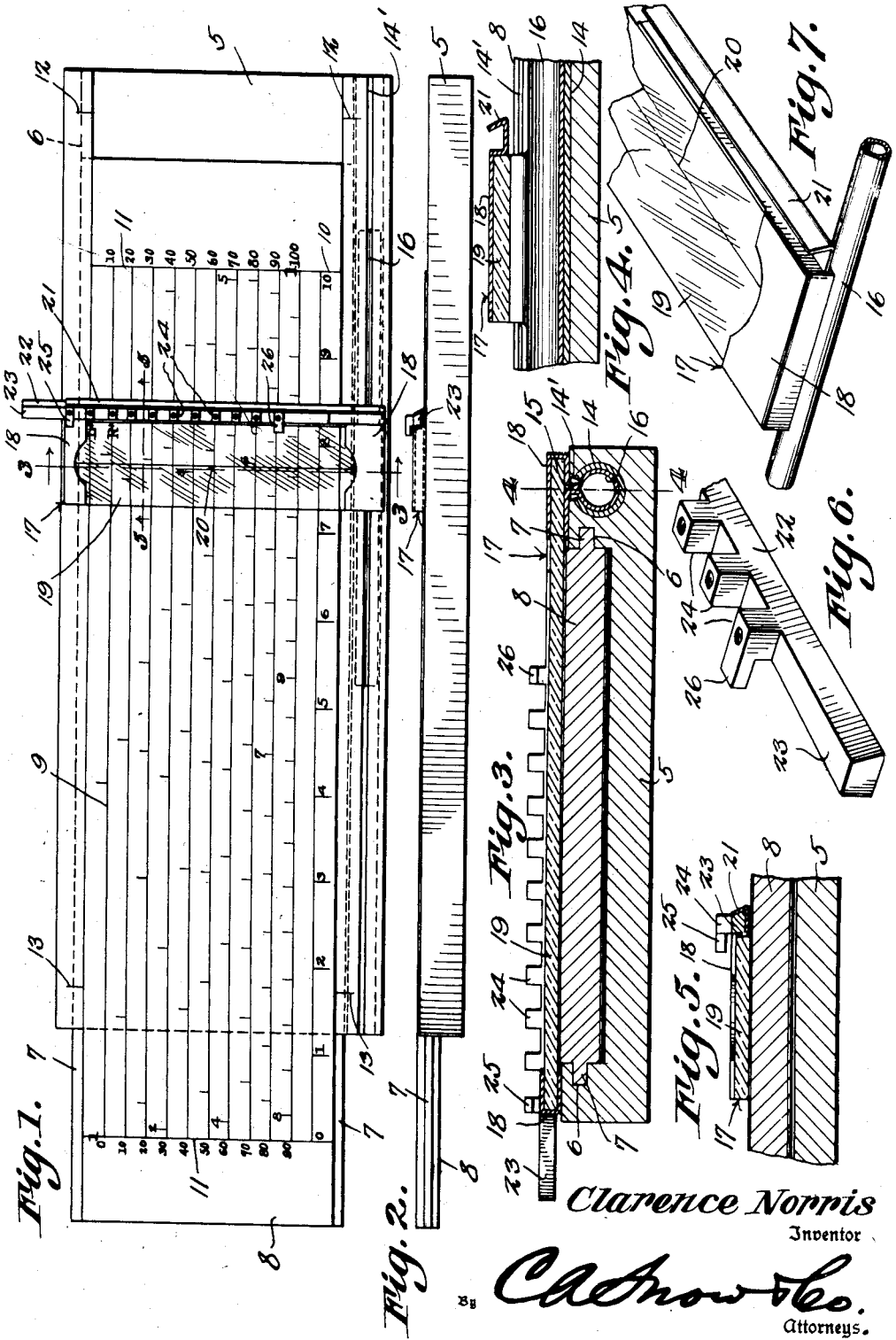
Clarence Norris
Inventor
By C. A. Snow & Co.
Attorneys.

Jan. 8, 1935.   C. NORRIS   1,987,536
SLIDE RULE
Filed Nov. 15, 1932   2 Sheets-Sheet 2

Inventor
Clarence Norris
By C.A. Snow & Co.
Attorneys.

Patented Jan. 8, 1935

1,987,536

UNITED STATES PATENT OFFICE 1,987,536

SLIDE RULE

Clarence Norris, Washington, D. C.

Application November 15, 1932, Serial No. 642,797

4 Claims. (Cl. 235—70)

This invention relates to a logarithmic calculating device of the slide rule type, an important object of the invention being to provide a device of this character so constructed that the accuracy of the slide rule in solving problems, will be greatly increased.

Another object of the invention is the provision of a slide rule which does not require the matching of graduations, in the operation of the device.

Another important object of the invention is the provision of a logarithmic calculating device of the slide rule type wherein it is possible to make mathematical calculations with the use of only one logarithmic scale.

A still further object of the invention is to provide a calculating device wherein only one logarithmic scale is used in multiplying or dividing, thereby insuring greater freedom of operation.

Another important object of the invention is the provision of a slide rule having means for indicating the answer of a mathematical problem solved with the device, thereby eliminating the necessity of the operator making further pencil or mental calculations, to determine the answer.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a calculating device constructed in accordance with the invention.

Figure 2 is a side elevational view of the device.

Figure 3 is a sectional view taken on line 3—3 of Figure 1.

Figure 4 is a sectional view taken on line 4—4 of Figure 3.

Figure 5 is a sectional view taken on line 5—5 of Figure 1.

Figure 6 is a fragmental perspective view of the indicator, forming an important feature of the invention.

Figure 7 is a fragmental perspective view of the rider, forming a part of the device.

Figure 8:
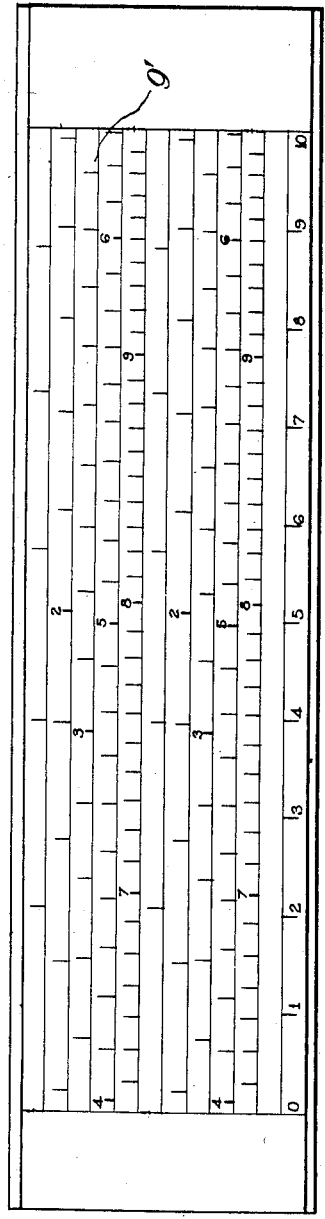
Figure 8 is a plan view of the opposite side of the slide shown in Figure 1.

Referring to the drawings in detail, the device comprises a body portion or base 5, which has its upper surface formed with a cut away portion, the edges of the cut away portion being formed with grooves 6, to receive the tongues 7, extending from the side edges of the slide 8, so that the slide may be moved freely over the body portion 5.

The slide 8 is provided with markings 9 indicating one cycle of the logarithmic scale divided into equal linear portions placed in consecutive order, one under the other, horizontal and parallel with respect to each other with the same interval of space therebetween and with each linear portion beginning and ending on the same index lines 11 near the ends of the slide. Along the lower edge of the slide are markings 10 indicating a scale of inches or other units of measure. These lines 11 are adapted to register with the lines 12 and 13 formed near the ends of the body portion 5, during the operation of the slide in solving a mathematical calculation, in a manner to be hereinafter more fully described.

As clearly shown by Figure 1 of the drawings, a groove 14 is formed longitudinally of the body portion, and has a longitudinal opening 14' to permit the neck 15 of the tubular support 16, to operate therethrough.

Thus it will be seen that due to this construction, the rider may operate freely backward and forward within the opening 14'.

The support 16, forms a part of the frame of the rider 17, which frame comprises end members 18, so constructed that they clamp the transparent member 19, in holding the transparent member in position.

A line 20 is formed longitudinally of the member 19, and is disposed at a point substantially intermediate the side edges of the transparent member 19. This line 20 plays an important part in the operation of the device.

Formed longitudinally of the rider, is a trough that has a beveled or inclined wall 21 cooperating with the beveled surface 22 of the indicator 23, so that the indicator may slide freely, throughout the length of the trough 21 but held against displacement therefrom. Indicia L and R are formed on the transparent member 19, and are arranged near the upper end thereof, the indicia R being directly over the top linear portion while the indicia L is disposed on a line spaced above the top linear portion, a distance equal to the distance between adjacent linear portions of the logarithmic scale, the provision of these indicia, which indicate right and left, will be clearly understood when the operation of the device is considered.

Rising from the indicator 23, are lugs 24, the number of lugs being controlled by the number of linear portions provided on the logarithmic scale, it being understood that there is always provided one more lug than the number of linear portions into which the scale is divided, so that when the indicator has been moved to a position where the bottom lug thereof extends one space below the bottom linear portion of the scale, there will be a lug opposite to the uppermost division line 9. If the indicator should be moved so that the uppermost lug extends one space beyond the top linear portion of the scale, there will be a lug opposite the lowermost division line 9.

These lugs are arranged in spaced relation with respect to each other, the spaces between the lugs being equal to the spaces between the lines or linear portions of the slide 8. These lugs are formed with openings, for the reception of a pencil point or other suitable instrument, whereby the indicator may be moved longitudinally of the trough 21, for purposes to be hereinafter more fully described.

The uppermost lug 24, is provided with a lateral extension 25, while the lowermost lug 24 is formed with a lateral extension 26.

Figure 8 shows two cycles of the logarithmic scale marked with lines 9' in equal linear portions, on the opposite side of slide 8 shown in Figure 1, each cycle extending over one half the length and number of equal linear portions, as occupied by the one cycle shown in Figure 1.

Figure 9:
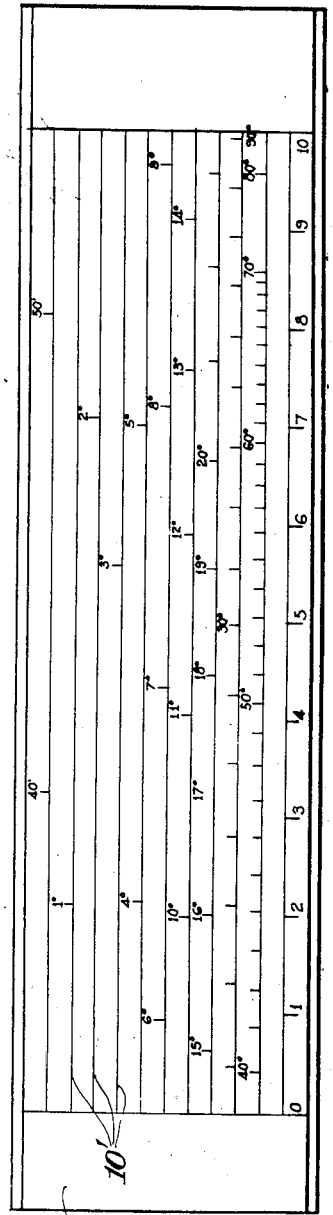
Figure 9 is a plan view of a modified form of slide.

Figure 9 shows a slide 8' having lines 10' indicating log-sines of angles marked, in equal linear portions, on one side of an extra slide and to the same scale or proportion as that used in marking the opposite side of slide shown in Figure 8.

Figure 10:
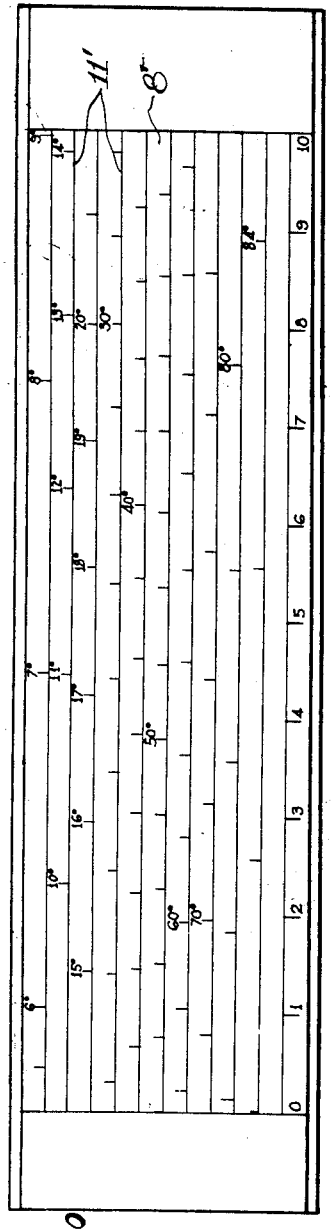
Figure 10 is a plan view of the opposite side of the slide shown by Figure 9.

Figure 10 shows the opposite side of slide 8' formed with lines 11' indicating log-tangents of angles marked, in equal linear portions, and to the same scale or proportion as that used in marking the slide shown in Figure 8.

The slide is so marked and constructed that the positions, of the lines denoting the equal linear portions or parallel lines 9 on both sides of the slide will be identical when considered in normal position.

The slide as shown in Figure 8 is to be used in conjunction with slide shown in Figure 1, for determining square roots and raising numbers to the second power, and it is also to be used in conjunction with the extra slide as shown in Figures 9 and 10 for the solution of problems in trigonometry.

In view of the foregoing detail description of the mechanical operation of the rule, it is believed that further detail description of the mechanical operation is unnecessary, as structures of this kind are well known, and other suitable structures may be utilized, without departing from the spirit of the invention.

The calculating device is operated by moving the slide along the base, and moving the rider over the slide, the result being obtained immediately by reading opposite the lugs on the indicator 23.

For example, in the operation of the rule to solve a problem such as 9 multiplied by 7, first move the slide 8 to normal position, or a position wherein the index line 11 at the left of the slide registers with the line 13, and the index line 11 at the opposite end of the slide registers with the line 12; second, move the rider until the line 20 thereof registers with the first factor or 7, then set bottom lug 24 over the line on which the first factor or 7, occurs; third move slide 8 to the right until line 11 at the left of the slide falls under the line 20 of the rider; fourth move the rider until the line 20 thereof is in registry with the second factor or 9, and since the slide has been moved to the right during the third step of the operation, then move the lug 24, that is at the indicia R, over the linear portion on which the second factor occurs; fifth set slide to its normal position, and the answer will be indicated by the number appearing under the line 20, and in line with the top or bottom lug 24, which ever the case may be.

It will of course be understood that in multiplication the right or left movement of the slide in third operation, is determined by inspection, and depending upon which direction of movement will permit the line 20 to be set in registry with the second factor, within the scope of markers or lines, 12 and 13, when the fourth operation of the rider has been completed.

In case that the slide 8 has been set to the left, to accomplish the third operation of the rule in solving a multiplication calculation, then in the fourth operation, the lug 24 that has fallen opposite to the indicia "L" on the rider, is moved to the line on which the second factor occurs; then set the slide 8 to its normal position, and the answer of the multiplication calculation will appear in registery with the line 20 on the linear protion of the logarithmic scale that aligns with the top or bottom lug 24.

When the answer falls opposite to the top lug, the whole numbers or digits in the answer will equal the total of the whole numbers in the two factors, when the answer is present at the bottom lug, then the whole numbers or digits in the answer will be one less than the total of the whole numbers in the two factors.

When multiplying one number by another, the settings of the slide and rider, determine the location of the answer, horizontally on the logarithmic scale, and the indicator determines the equal linear portion of the logarithmic scale on which the answer appears, and when the total of the lengths of the two parts of linear portion or portions, to the left of the points where the two factors are graphically represented, is less than the whole length of an equal linear portion, then it is necessary to move the slide to the right, and when the total of the lengths of the two parts is greater, then it is necessary to move the slide to the left, during the third operation of the rule.

The slide rule, as illustrated on drawings, shows a convenient arrangement of the logarithmic scales for explaining the purpose and operation and it is not to be considered as limiting the number of linear portions into which the different logarithmic scales are to be divided, in this invention. It is intended to cover by this invention the use of any length for the logarithmic scales, divided into any number of equal linear portions.

The scale of inches 10 or other unit of measure, appearing on all four sides of the two slides is for use in finding logarithms and roots of numbers and for raising numbers to powers. Both ends 11 of all equal linear portions are to be marked numerically to designate their position, in inches or other unit of measure, in the logarithmic scales.

I claim:

1. The combination with a calculating device of the slide rule type, including a base, a slide member movable over the base and a rider movable over the slide member, said slide member, base and rider having indicia adapted to co-operate in making calculations, of an indicating bar having lugs arranged in spaced relation with each other throughout the length thereof, said lugs cooperating with the indicia of the slide member in indicating the location of the answer to the calculation.

2. A calculating device of the slide rule type, comprising a base having its upper surface cut out and formed with grooves, a slide member movable within the grooves and carrying rows of graduations, a rider slidable longitudinally of the base and having graduations co-operating with the graduations of the slide member in computing mathematical problems, an indicating rod carried by the rider, a plurality of lugs on the indicating rod arranged in spaced relation with each other for alignment with certain rows on the slide member, whereby one of said lugs will designate the row containing the answer.

3. The combination with a calculating device of the slide rule type, including a base having lines near the ends thereof, a slide member having graduations thereon, movable longitudinally of the base, a rider on the slide, said rider having a longitudinal groove formed in the upper surface thereof, an elongated indicator slidable in the groove, a plurality of lugs on the indicator and cooperating with the graduations on the slide member in indicating the answer to a mathematical problem, the number of lugs carried by the indicator exceeding the number of graduations on the slide member.

4. The combination with a calculating device of the slide rule type, including a base, a slide member movable over the base, a rider movable over the slide member an indicating bar movable over the rider, said base, slide member and rider having markings adapted to cooperate in making calculations, said indicating bar having devices arranged in spaced relation with each other, said devices cooperating with the markings on the slide member and rider in indicating the location of the answer to the calculation.

CLARENCE NORRIS.